(12) United States Patent
Vauchel et al.

(10) Patent No.: US 9,193,468 B2
(45) Date of Patent: Nov. 24, 2015

(54) ASSEMBLY FOR HOLDING THE INTERFACE OF STATIONARY OUTER STRUCTURE OF A NACELLE AND HOUSING OF A JET ENGINE

(75) Inventors: Guy Bernard Vauchel, Harfleur (FR); Pierre Caruel, Le Havre (FR); Patrick Gonidec, Bretx (FR); Georges Alain Bouret, Epouville (FR)

(73) Assignee: AIRCELLE, Gonfreville l'Orcher (FR)

( * ) Notice: Subject to any disclaimer, the term of this patent is extended or adjusted under 35 U.S.C. 154(b) by 399 days.

(21) Appl. No.: 13/510,329

(22) PCT Filed: Nov. 8, 2010

(86) PCT No.: PCT/FR2010/052393
§ 371 (c)(1),
(2), (4) Date: May 17, 2012

(87) PCT Pub. No.: WO2011/070260
PCT Pub. Date: Jun. 16, 2011

(65) Prior Publication Data
US 2012/0217372 A1 Aug. 30, 2012

(30) Foreign Application Priority Data
Nov. 18, 2009 (FR) .................................... 09/05536

(51) Int. Cl.
| F01D 25/28 | (2006.01) |
| B64D 29/00 | (2006.01) |
| B64D 29/06 | (2006.01) |
| F02C 7/20 | (2006.01) |
| F16L 23/00 | (2006.01) |
| F02K 1/04 | (2006.01) |

(52) U.S. Cl.
CPC . B64D 29/06 (2013.01); F02C 7/20 (2013.01); F02K 1/04 (2013.01); F16L 23/00 (2013.01); Y10T 403/64 (2015.01); Y10T 403/648 (2015.01)

(58) Field of Classification Search
CPC .............. F02K 1/04; F02K 1/64; F02C 7/20; B64D 29/06; F16L 23/00; F16L 23/20; F16L 23/10
USPC ................ 248/554, 74.1, 74.3, 226.1, 205.2; 244/53 B, 54; 60/226.2; 285/2, 554; 415/118, 126, 144, 201, 213.1, 221.1, 415/198.1, 214.1, 221.2; 403/335, 338
See application file for complete search history.

(56) References Cited

U.S. PATENT DOCUMENTS 2,653,836 A * 9/1953 Christophersen et al. .... 285/411
4,037,809 A * 7/1977 Legrand ........................ 248/554
(Continued)

FOREIGN PATENT DOCUMENTS

FR    2291091 A1    6/1976
FR    2900979 A1    11/2007

OTHER PUBLICATIONS

International Search Report issued Jul. 21, 2011 by European Patent Office re: PCT/FR2010/052393; pp. 6; citing: FR 2 291 091 A1, FR 2 900 979 A1 and U.S. Pat. No. 2,653,836 A.

Primary Examiner — Tan Le
(74) Attorney, Agent, or Firm — Brinks Gilson & Lione

(57) ABSTRACT

An assembly to hold an interface of a stationary outer structure of a nacelle and a casing of a jet engine includes first and second raised elements and two half rings. The first raised element belongs to an upstream end of the stationary outer structure, and the second raised element belongs to a downstream end of the casing. The first and second raised elements are formed so as to be placed in contact with each other, and the two half-rings are formed by a wall and an abutment. The wall defines a housing to receive the first and second raised elements when the casing and the stationary outer structure are mounted edge to edge, and the abutment is formed so as to keep the first and second raised elements in the housing.

15 Claims, 9 Drawing Sheets

(56) References Cited

U.S. PATENT DOCUMENTS

| | | | |
|---|---|---|---|
| 4,044,973 A * | 8/1977 | Moorehead | 244/54 |
| 4,469,354 A * | 9/1984 | Caldwell | 285/2 |
| 4,683,717 A * | 8/1987 | Naud | 60/226.1 |
| 2012/0217372 A1 * | 8/2012 | Vauchel et al. | 248/554 |

* cited by examiner

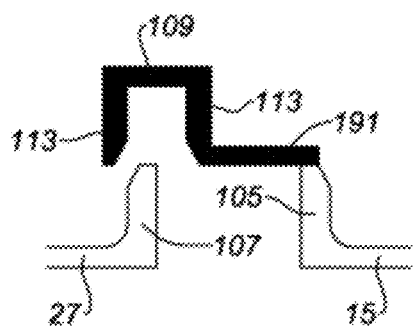
Fig. 17
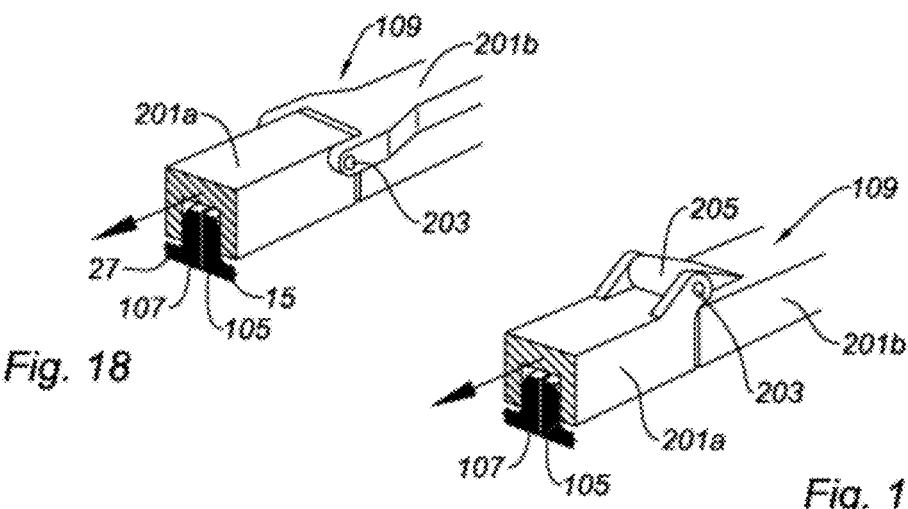
Fig. 18
Fig. 19
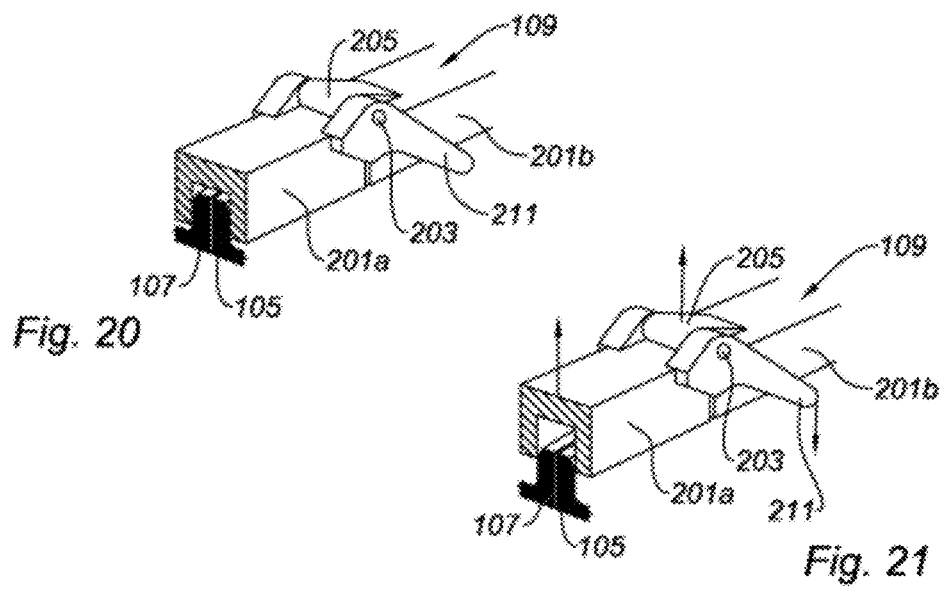
Fig. 20
Fig. 21

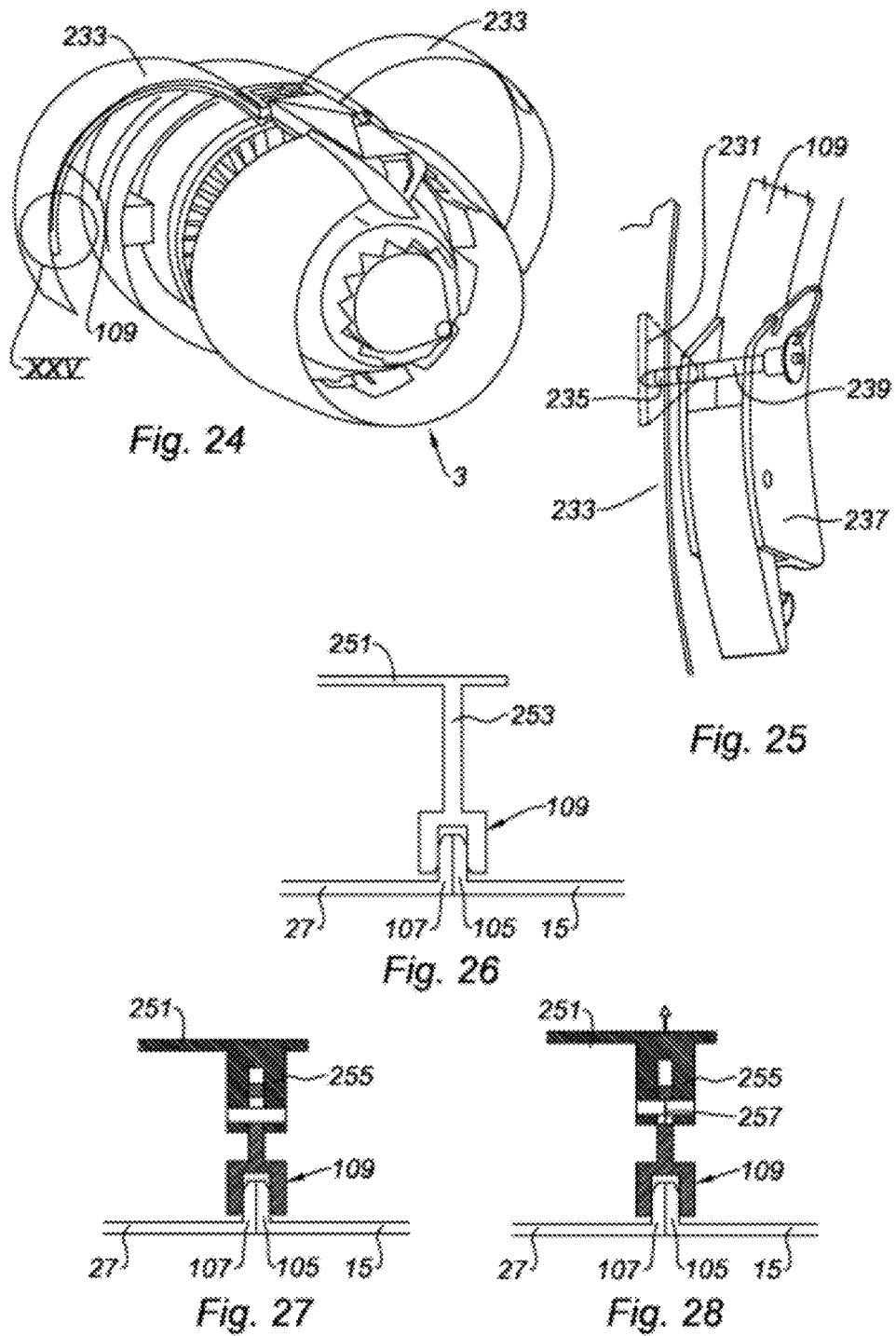

ASSEMBLY FOR HOLDING THE INTERFACE OF STATIONARY OUTER STRUCTURE OF A NACELLE AND HOUSING OF A JET ENGINE

TECHNICAL FIELD

The present invention relates to an assembly for holding the interface of a jet nacelle and the structure of a nacelle reverser surrounding said jet engine.

The present invention also relates to a propulsion assembly comprising such a holding assembly.

BRIEF DISCUSSION OF RELATED ART

An aircraft is generally moved by a propulsion assembly comprising a jet engine surrounded by a nacelle.

The jet engine comprises fan blades upstream that are actuated by a motor. The fan blades are surrounded by a case making it possible to mount said jet engine in the nacelle.

The fan of the jet engine is essentially made up of a rotary shaft bearing a plurality of vanes. At their radial end, the vanes are circumferentially surrounded by a case.

The fan cases are generally machined metal elements.

The jet engine can be a dual-flow jet engine capable of generating a hot air flow (also called primary flow) coming from the combustion chamber of the jet engine, and a cold air flow (secondary flow) coming from the fan that circulates outside the jet engine through an annular channel, also called "stream," formed between a fairing of the jet engine and an inner wall of the nacelle. Behind the nacelle, the two primary and secondary flows mix.

This nacelle is generally equipped with a thrust reverser. During the landing of an airplane, the thrust reverser makes it possible to improve the braking capacity of the airplane by reorienting at least part of the thrust generated by the jet engine forward. During this phase, the reverser obstructs the gas jet nozzle and orients the jet flow from the engine toward the front of the nacelle, thereby generating a counter-thrust that is added to the braking of the airplane's wheels.

More specifically, a nacelle generally has a structure comprising an air intake upstream of the motor, a middle structure intended to surround the case of the jet engine, and a downstream structure comprising an inner fixed structure (IFS) and an outer fixed structure (OFS) intended to surround the combustion chamber of the jet engine and housing thrust reverser means.

The thrust reverser means are varied and can be in the form of at least one mobile cowl, called "thrust reversal cowls," moving in translation owing to actuators in a direction substantially parallel to a longitudinal axis of the nacelle.

During this flight phase, the structure of the thrust reverser undergoes axial aerodynamic forces that tend to cause the thrust reverser means to withdraw longitudinally relative to the jet engine.

50 as not to pass all of these forces on to the fastening points of the downstream structure on the mast, the upstream part of the downstream structure, in particular the fixed outer structure, is connected at the downstream end of the fan casing of the jet engine.

The structure of the thrust reverser is generally made in two half-parts articulated at the upper portion of the pylon, called "D-duct" structure. In this configuration, the holding between the casing and the outer fixed structure is done by a male part, generally supported by the outer fixed structure, cooperating in a female part, generally supported by the casing.

However, such a configuration can only be suitable for a D-Duct structure because the release of the two opposite structures can only be done in a radial direction.

The downstream structure can also assume the form of an external assembly in a single piece without a break in structural continuity, called "O-duct" structure. This outer assembly is dissociated from the inner structure surrounding the motor and is actuated to provide access to the body of the motor through rectilinear movement toward the back of the nacelle beyond the withdrawal value necessary for the thrust reversal. The maintenance of the outer fixed structure and the casing cannot be done identically to the maintenance of the D-duct structures.

The holding is then done by bolts once the casing and the outer fixed structure are mounted edge-to-edge.

However, such holding does not allow fast access to the motor.

BRIEF SUMMARY

One aim of the present invention is therefore to provide a holding assembly allowing holding uniformly distributed over the circumference of the interface of the casing and the outer fixed structure, to reduce maintenance time, facilitate the latter and limit the number of necessary parts and the cost.

To that end, according to a first aspect, the invention relates to an assembly for holding the interface of a stationary outer structure of a nacelle and housing of a jet engine, said assembly including:
- a first raised element belonging to the upstream end of the outer fixed structure;
- a second raised element belonging to the downstream end of the housing,
- said first and second raised elements being formed so as to be placed in contact with each other;
- two half-rings formed by a wall defining a housing that is formed so as to receive the first and second raised elements when the casing and the outer fixed structure are mounted edge to edge, and an abutment means formed so as to keep the first and second raised elements in the housing.

The holding assembly according to the invention therefore makes it possible to connect, via the half-rings, the downstream end of the casing and the upstream end of the outer fixed structure of the downstream structure housing the thrust reverser means.

The holding assembly according to the invention therefore makes it possible to lock and unlock the interface of the casing and the outer fixed structure simply, effectively, and quickly while using a small number of parts. The maintenance time as well as the cost are reduced and controlled.

Owing to the annular configuration of the invention, the holding is uniformly distributed on the circumference of the interface.

According to other features of the invention, the holding assembly of the invention comprises one or more of the following optional features considered alone or according to all possible combinations:
- the wall forms a housing with a substantially U- or V-shaped transverse section;
- longitudinal and/or transverse play is present between the non-facing surface of the raised elements and the wall forming the housing;
- at least one raised element has a ramp configured to cooperate with at least one lateral edge of the wall that has an inclined surface complementary to the ramp when said raised element is inserted in the housing, which allows a slight misalignment of the two raised elements before closing the half-ring;

at least one raised element comprises a sealing means so as to ensure sealing between the first raised element and the second raised element when the latter are received in the housing, which makes it possible to avoid any leak of the cold air flow and the hot air flow so as not to create disruptions in the performance of the propulsion assembly according to the invention;

the raised element(s) comprise a transverse centering means relative to the casing and the outer fixed structure without making the holding assembly of the invention heavier;

at least one half-ring comprises a lever means making it possible to facilitate the transition from the locking position, in which the two raised elements are received in the housing, to the unlocking position in which the raised elements are outside the housing;

the lever means is a protuberance configured to be attached to the end of a half-ring and bear on at least one fixed surface;

the two half-rings are secured to one another by fastening means, which makes it possible to ensure the tightening and holding force of the raised elements;

the fastening means comprise at least one bolt or at least one three-point bolt with a hook;

at least one half-ring comprises a foolproof device so as to avoid locking said half-ring without the raised elements;

at least one half-ring is formed from a multitude of parts so as to adapt the flexibility or rigidity of the half-ring;

the part comprising the housing is made in several sectors secured to one another by fastening means, which advantageously makes it possible to lift the half-ring on the parts with a small travel;

at least one sector is mounted hingedly on the next one;

the articulation of the sector is associated with one or two levers mounted on either side of said sector so as to facilitate the unlocking of the sector;

at least one half-ring comprises a holding means configured to support said half-ring in the unlocking position;

the holding means is in the form of a connecting rod fastened on said half-ring and on a holder fastened on the casing or on the outer fixed structure;

each half-ring is hingedly mounted substantially at 12:00 on the outer fixed structure.

According to another aspect, the invention relates to a propulsion assembly comprising a jet engine housed in a nacelle that can be connected to the aircraft by an attachment pylon, the jet engine comprising fan blades surrounded by a casing mounted edge to edge with an outer fixed structure of the downstream structure of the nacelle that houses thrust reverser means, said propulsion assembly comprising a holding assembly according to the invention.

According to other features of the invention, the inventive propulsion assembly comprises one or more of the following optional features, considered alone or according to all technically possible combinations:

at least one half-ring is mounted substantially at 12:00 on the nacelle, which makes it possible to have the greatest possible clearance and facilitate access to the jet engine;

at least one half-ring is hinged on the attachment mast or on the casing via a stationary pivot;

a connecting rod connecting the pivot points positioned on each side of the attachment mast ensures the fastening of the two half-rings to one another so as to ensure peripheral charge continuity;

at least one half-ring is mounted on the upstream cowl at the outer fixed structure;

the two half-rings are supported by the upstream cowl with play, which helps with proper operation and prevents interfacing problems due to the hyperstatic effects between the outer fixed structure and the casing;

at least one half-ring is connected to the cowl via a partition or a fitting configured to receive a half-ring.

BRIEF DESCRIPTION OF THE DRAWINGS

The invention will be better understood upon reading the following non-limiting description, done in reference to the appended figures.

FIG. 17 is a transverse cross-section of an embodiment of the holding assembly according to the invention;

FIGS. 18 to 21 are perspective side views of a half-ring of the holding assembly according to the invention;

FIG. 24 is a front perspective view of an alternative of the holding assembly of the invention mounted on a propulsion assembly;

FIG. 25 is an enlargement of zone XXV of FIG. 24;

FIGS. 26 to 28 are transverse cross-sections of a half-ring of the holding assembly according to the invention mounted on the cowl of the outer fixed structure of the propulsion assembly of the invention;

DETAILED DESCRIPTION

Figure 1:
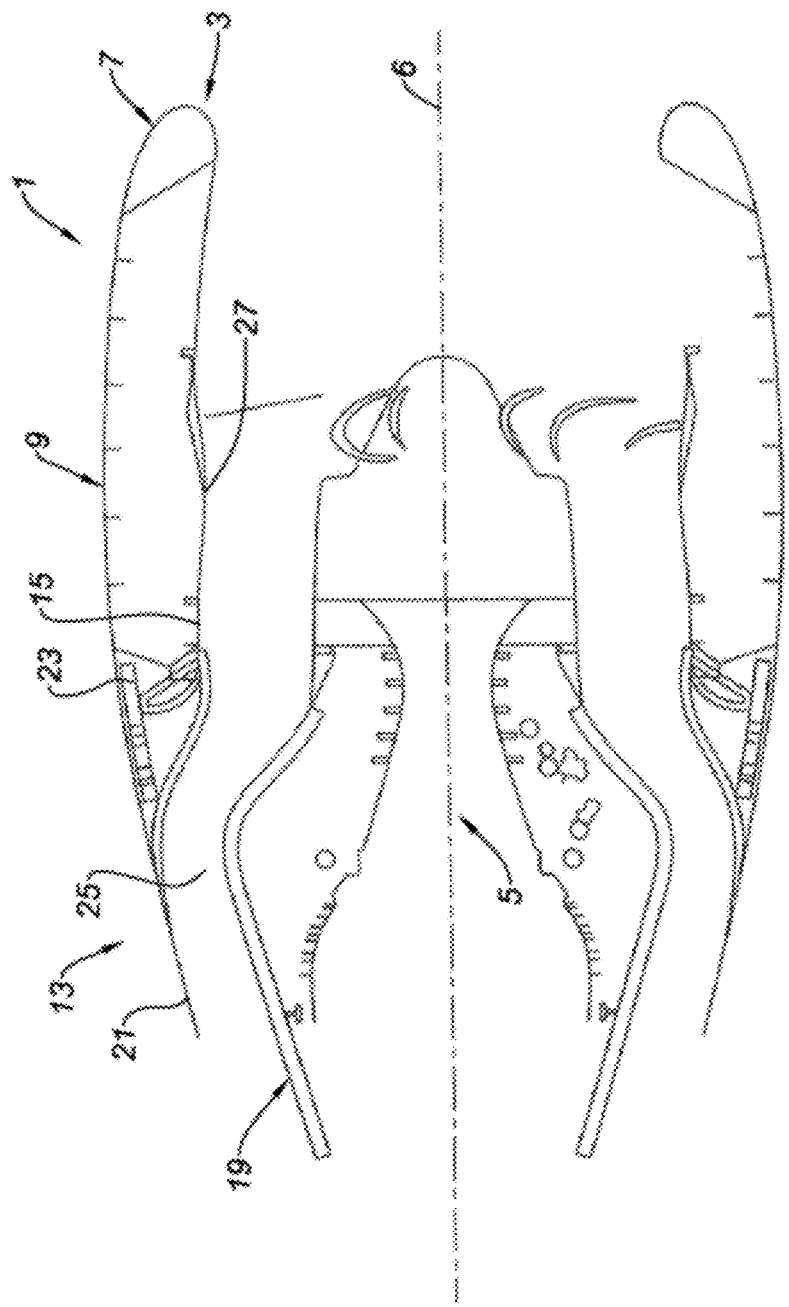
FIG. 1 is a longitudinal cross-section of a propulsion assembly according to the invention.

According to the embodiment shown in FIG. 1, the propulsion assembly 1 according to the invention comprises a nacelle 3 surrounding a jet engine 5 that both have an axis of revolution or primary longitudinal axis 6. The nacelle 3 typically comprises an upstream air intake structure 7, a middle structure 9 surrounding the blades of a fan 11 of the jet engine 5, and a downstream structure 13. The downstream structure 13 comprises, in a known manner, an outer structure 15 (OFS), housing thrust reverser means 17, and an inner structure 19 (IFS). The thrust reverser means here are in the form of a mobile cowl 21 in longitudinal translation toward the downstream direction of the nacelle 3 and a fixed grid 23 through which the cold air flow is deflected. The nacelle 3 is secured downstream using any suitable means, in particular connecting rods, to a suspension mast, not shown in FIG. 1, intended to attach the nacelle 3 under an aircraft wing.

The outer fixed structure 15 and the inner fixed structure 19 also define an annular flow channel 25 through which the cold air flow is intended to circulate.

The inner fixed structure 19 is intended to cover a downstream portion of the jet engine extending downstream of the blades of the fan 11.

The fan blades 11 of the jet engine are topped circumferentially by a casing 27. The casing 27 is intended to be attached to the outer fixed structure 15 of the downstream structure. More particularly, the upstream end of the casing 27 is configured to be connected to the downstream end of the outer fixed structure 15. In that case, the casing 27 and the outer fixed structure are said to be "mounted edge to edge."

According to the invention, a holding assembly 101 makes it possible to hold and lock the outer structure 15 and the casing 27. The assembly according to the invention 101 comprises:
- a first raised element 105 belonging to the upstream end of the outer fixed structure 15;
- a second raised element 107 belonging to the downstream end of the casing 27;
- said first 105 and second 107 raised elements being configured to be put in contact with one another;
- two half-rings 109 formed by a wall defining a housing 111, configured to receive the first 105 and second 107 raised elements when the casing 27 and the outer fixed structure 15 are mounted edge to edge, and abutment means 113 configured to keep the first 105 and second 107 elements in the housing 111.

The holding assembly of the invention 101 makes it possible to connect, via the two half-rings 109, the interface of the downstream end of the casing 27 and the upstream end of the outer fixed structure 15.

Due to the annular configuration of the invention, the holding is uniformly distributed over the circumference of the interface.

The holding assembly according to the invention 101 also makes it possible to lock and unlock this interface simply, effectively, quickly, and using a small number of parts. The maintenance time, costs and mass are reduced and controlled relative to the prior art. In fact, to lock or unlock the holding assembly, one need only translate the casing 27 and the outer fixed structure 15 longitudinally relative to the longitudinal axis, then pivot each half-ring 109 on the raised elements 105 and 107 placed opposite one another or respectively release said half-ring 109 by pivoting outside the raised elements 105 and 107. As a result, it is pointless to separate a male part and a female part or to remove periodic means to release the casing 27 and the outer fixed structure 15. The abutment means 113 advantageously make it possible to keep the two raised elements 105 and 107 in the housing 111.

The "locking position" is defined as the position of the inventive holding assembly 101 in which the two raised elements 105 and 107 belonging to the casing 27 and the outer fixed structure 15 are received in the housing 111 of at least one half-ring 109.

The "unlocking" or "maintenance" position is the position of the inventive assembly 101 in which the two raised elements 105 and 107 belonging to the casing 27 and the outer fixed structure 15 are outside the housing 111 of at least one half-ring 109.

The wall of each half-ring 109 therefore defines the housing 111 and the abutment means 113. The abutment means 113 is for example formed in the lateral extension of the wall defining the housing 111. At least one, or even both of the half-rings 109 can be a double knife, i.e. the wall forms a housing 111 with a transverse section in the shape of a bowl, in particular with a substantially V- or U-shaped transverse section. In that case, the raised elements 105 and 107 are in the form of a clip normal or transverse to the longitudinal axis 6 of the nacelle 3. Advantageously, the raised elements 105 and 107 can have a continuous structure so as to guarantee a uniform load distribution over said raised elements 105 and 107.

Figure 4:
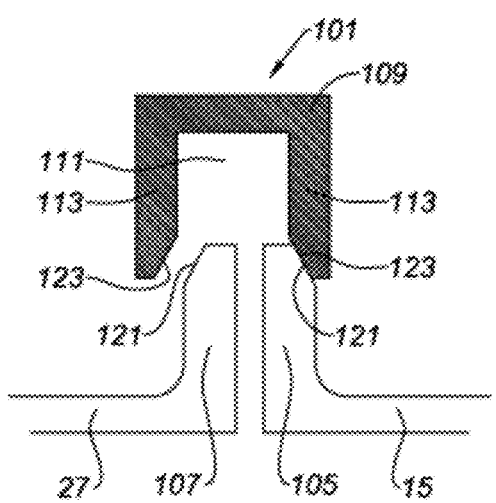
Figure 5:
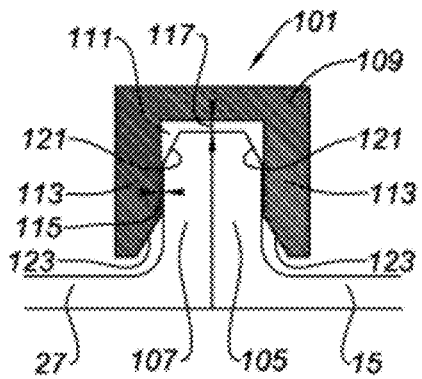

As shown in FIGS. 4 and 5, when the first 105 and second 107 elements are received in the housing 111, said elements 105 and 107 are in contact. According to one alternative, the wall forming the housing 111 and the abutment means 113 of the half-ring 109 is not in contact with the opposite surface, i.e. not across from, said elements 105 and 107, which defines play 115 and 117. The play 115 and/or 117 makes it possible to limit the transverse and/or longitudinal travel of the raised elements 105 and 107. The play 115 can therefore be longitudinal, i.e. along the primary longitudinal axis 6 of the nacelle, or transverse 117, i.e. along an axis perpendicular to the primary axis 6. It is possible to have play that is both longitudinal 115 and transverse 117 as shown in FIGS. 4 and 5. The play 115 and 117 advantageously makes it possible to take the manufacturing limit and shape tolerance of the raised elements 105 and 107 to be held into account. Advantageously, such play 115 and 117 allows placement of the interface of the casing 27 and the outer fixed structure 15 without stressing the half-ring 109. As a result, in the case of longitudinal play 115, when the jet engine 5 is operating, the outer fixed structure 15 undergoes thrust that tends to move it away from the casing 27. The two raised elements 105 and 107 then come into contact with the abutment means 113 and are thereby retained in the housing 111.

At least one raised element 105 or 107 can have a ramp 121 configured to cooperate with at least one lateral edge of the wall that has an inclined surface 123 complementary to the ramp 121 when said raised element 105 or 107 is inserted into the housing 111, which allows a slight misalignment of the two raised elements 105 and 107 before closing the half-ring 109. In this way, it is advantageously possible to bring the two raised elements 105 and 107 closer together during locking of the casing 27 and the outer fixed structure 15. According to the embodiment shown in FIGS. 4 and 5, the walls of the two elements 105 and 107 not across from each one another have such a ramp 121. In that case, the lateral edges of the wall 113 each have an inclined surface 123 on which a ramp 121 can slide. As shown in FIG. 4, during the introduction of the raised elements 105 and 107 into the housing 111, the ramp 121 slides on the inclined surface 123 until the raised elements 105 and 107 are introduced into the housing 111.

Typically, the ramp 121 can have an angle smaller than or equal to about 30°.

Figure 6:
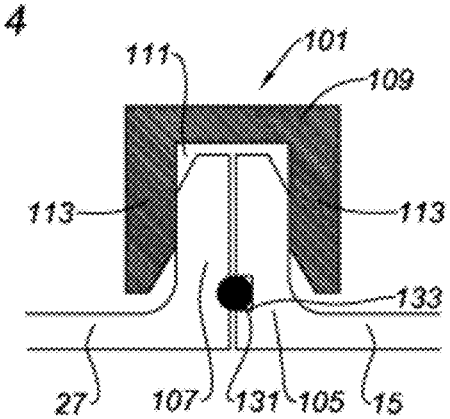
Figure 8:
FIG. 8 is a perspective view of one embodiment of the attachment of the two half-rings of the assembly according to the invention.

As shown in FIG. 6, at least one raised element 105 can comprise a sealing means 131 so as to ensure sealing between the first raised element 105 and the second raised element 107 when the latter are housed in the housing 111, which makes it possible to avoid any leak of the cold air flow and hot air flow so as not to generate disruptions on the performance of the propulsion assembly 1 according to the invention. The sealing means 131 can assume the form of a seal housed in the housing 133 formed in one of the raised elements 105.

The raised element(s) 105 and 107 can comprise a transverse centering means relative to the longitudinal axis 6 of the nacelle 3, which makes it possible to facilitate closing of the casing 27 and the outer fixed structure 15 without making the inventive holding assembly 101 heavier. Such a centering means makes it possible to limit the forces created by the explosion of a fan blade 11, which tends to misalign and separate the casing 27 and the outer fixed structure 15.

Figure 7:
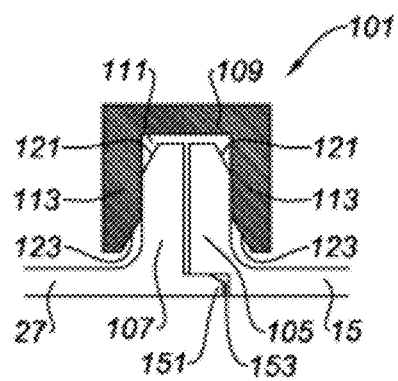
FIGS. 4 to 7 are transverse cross-sections of alternative embodiments of FIG. 3.
Figure 2:
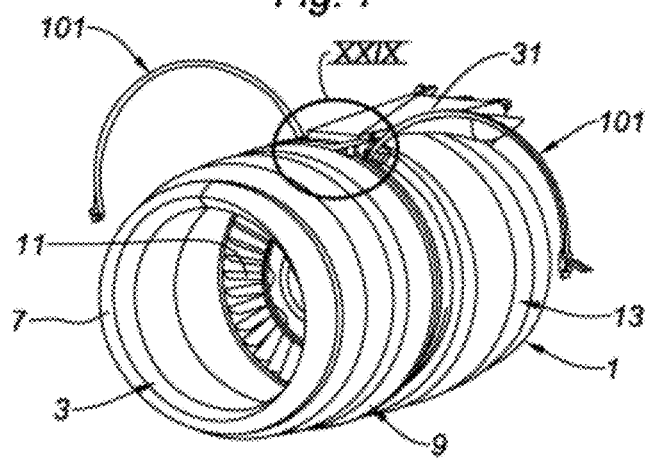
FIG. 2 is a perspective view of said propulsion assembly of FIG. 1.

The centering means can assume the form of a protuberance 151 belonging to the casing 27 configured to enter a recess 153 formed in the outer fixed structure 15 (see FIG. 7). Thus, any rotational force caused by the rotation of the imbalanced fan can be absorbed. As a result, each half-ring 109 only bears the axial forces.

At least one or even both of the half-rings 109 can comprise a lever means 161 making it possible to facilitate the locking and unlocking of said half-ring 109 on the raised elements 105 and 107 (see FIGS. 8 to 14). The lever means makes it possible to reduce the angular travel of said half-ring 109. In particular, in the case where a half-ring 109 is hinged using a pivot at 12:00 of the nacelle, i.e. near or on the attachment mast 31 when the latter is seen from the inlet of the nacelle 3, it is sometimes impossible to open a half-ring 109 enough to release the casing 27 and the outer fixed structure 15. As a result, the lever system 161 makes it possible to ensure the release of the casing 27 and said outer fixed structure 15 with a small pivot angle, i.e. less than 15°. Thus, the lever system 161 can be mounted upstream of the pivot point of the half-rings 109.

The lever means can be a protuberance 161 configured to be attached to the half-ring 109, in particular at an end, and to bear on at least one inner surface 165 of the holder 163 of each half-ring 109. Advantageously, in the locking position, the lever means 161 is not in contact with the casing 27, the outer fixed structure 15 or the holder 163 of said ring 109 so as not to generate parasitic forces.

Figure 9:
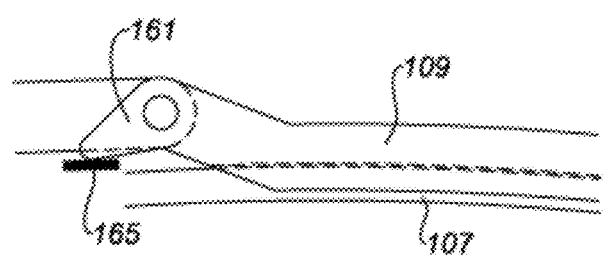
FIGS. 9 to 14 are side views of alternative embodiments of FIG. 8.
Figure 10:
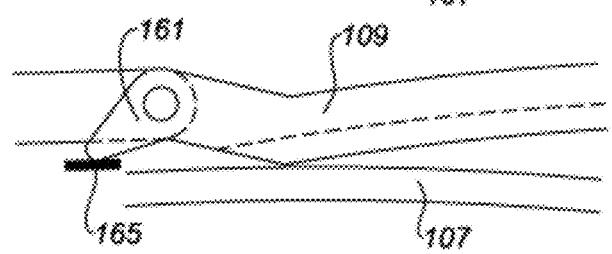

As shown in FIGS. 9 and 10, from the locking position, one moves the half-ring 109 by a small angle, smaller than 15°, so as to release said elements 105 and 107. As a result, the protuberance 161 comes into contact with the surface 165 of the holder, which results in producing a lever effect thereby requiring the half-ring 109 to completely release said raised elements 105 and 107. In the case of FIGS. 9 and 10, the holder 165 on which the lever means 161 bears is positioned on the "lower" surface, i.e. the surface closest to the interface of the casing 27 and the outer fixed structure 15.

Figure 11:
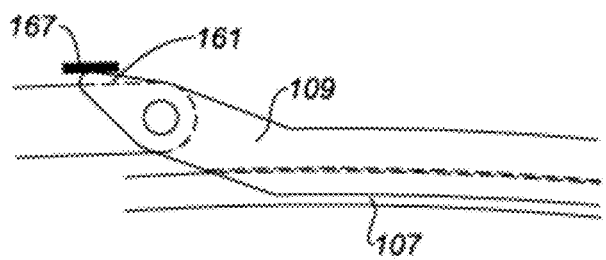
Figure 12:
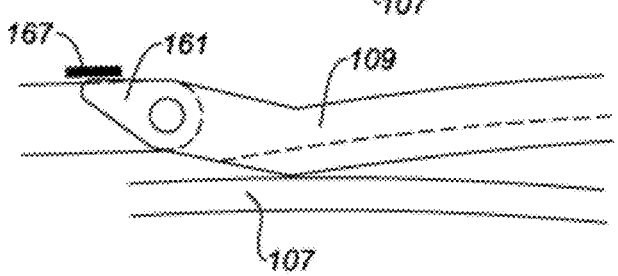

According to an alternative shown in FIGS. 11 and 12, the holder 167 on which the lever means 161 bears is positioned on the "upper" surface, i.e. the surface furthest from the interface of the casing 27 and the outer fixed structure 15. This configuration allows assistance for the fitting of the half-ring 109 on the raised elements 105 and 107.

Figure 13:
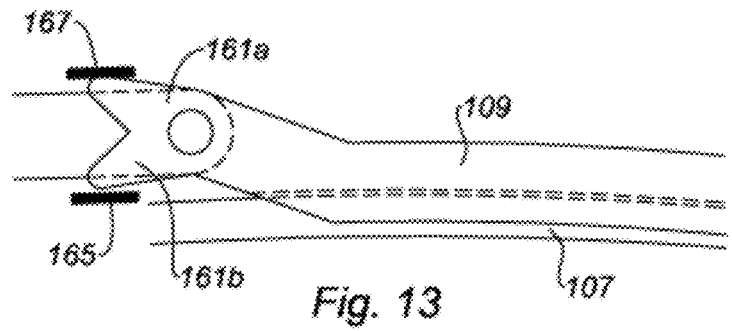
Figure 14:
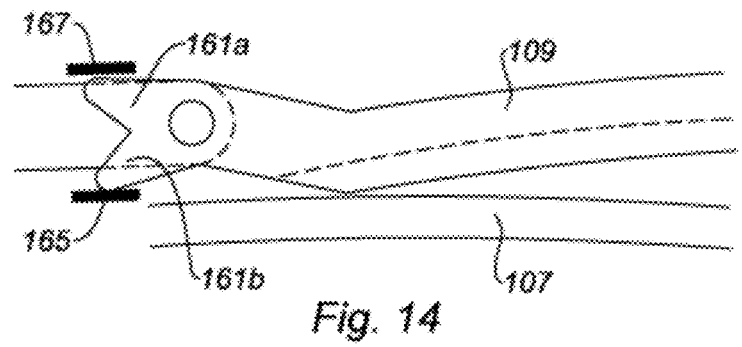

According to still another embodiment shown in FIGS. 13 and 14, the lever means can comprise two protuberances 161a and 161b connected to one another and each configured to bear on the lower surface and the upper surface.

Figure 15:
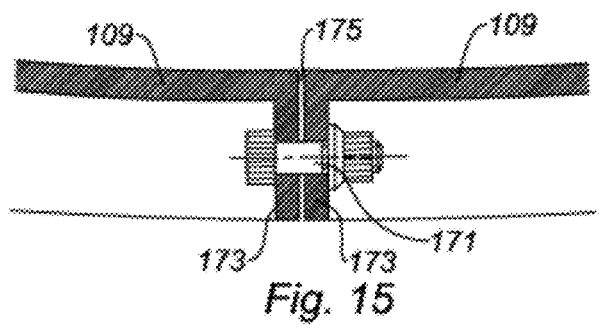
FIGS. 15 and 16 are side views of embodiments for fastening the two half-rings of the holding assembly according to the invention to one another.

As shown in FIG. 15, the two half-rings 109 can be fastened to one another by a fastening means, which makes it possible to ensure the tightening and holding force for the raised elements 105 and 107. A radial centering element can be added either by adding a centering pin or by integrating complementary shapes in both ends of the half-rings.

In the locking position, the two half-rings 109 can advantageously be attached at the 6:00 position relative to the nacelle 3 in front view. In that case, the fastening means of said half-rings 109 are located in that 6:00 position. To ensure the tightening and holding force of the raised elements 105 and 107, the locking of the two half-rings 109 can be done under tension, in particular by mechanical and manual fastening means.

Thus, the fastening means can comprise at least one bolt 171 (see FIG. 15), which makes it possible to lock the two half-rings 109 simply and inexpensively. To that end, the free end of a half-ring 109 can comprise two walls 173 substantially perpendicular to the rest of the half-rings, in other words going in the radial direction transverse to the longitudinal axis 3 of the nacelle 3. Said two walls are then facing each other when the two half-rings 109 are in the locking position. The bolt 171 can be associated with a nut passing through the two walls 173 so as to maintain the locking. The interface of the two walls 173 can be produced with play 175 after tightening the bolt 171, which is done so as to guarantee the holding force of the two rings 109 relative to one another. In that configuration, other bearing (not shown) can exist produced between the inner surface of the half-rings 109 and the surfaces not facing the raised elements 105 and 107.

Figure 16:
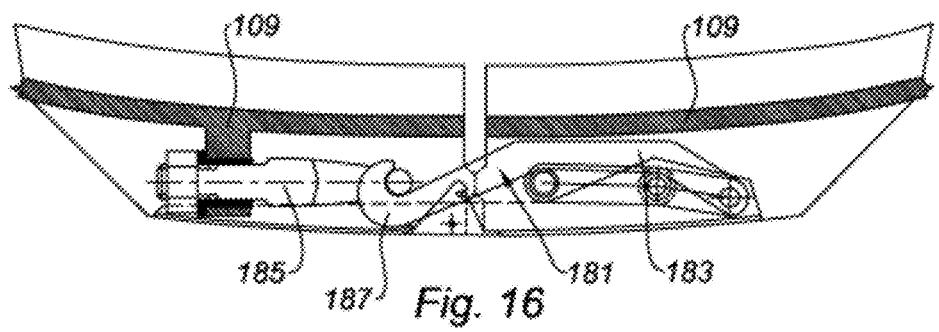

According to the embodiment of FIG. 16, the fastening means comprise a three-point bolt with a hook 181, which makes it possible to have a permanent bolt on the half-ring 109. According to the configuration shown in said FIG. 16, one of the half-rings 109 supports the part of the bolt comprising the hook 183 and the other half-ring 109 supports the part comprising the retaining member 185 of said hook 187. Advantageously, the retaining member 185 can be adjustable so as to make it possible to adjust the locking tension created by the cooperation of the hook 187 and the retaining member 185 when the two half-rings 109 are in the locking position.

According to one alternative, the contact of the half-rings 109 in the locking position is done in a plane substantially close to the alignment of the three-point bolt 181. The abutment of the half-rings can be identical to that of the preceding configuration.

According to another alternative not shown, at least two three-point bolts with hooks 181 are mounted on either side of the half-rings 109, which makes it possible to increase the locking reliability.

According to another alternative embodiment, a three-point bolt 181 can have some of its components lined so as to improve the reliability of said bolt 181. In particular, it is possible to have a single retaining member 185 configured to receive two distinct hooks 187 mounted across from the half-rings 109. It is also possible to line the connection leading the axis of the three-point bolt 181 to the fastener on the hook 187 so as to guarantee a high reliability level. Likewise, the pivot of the hook 187 can be lined by the presence of two concentric pivots with the same axis placed one in the other. Furthermore, the fastening means can be supported by a single-piece surrounding structure tolerating the damages that may also be borne by the half-ring 109.

In that configuration, as one example that is not shown, a first lateral band can overlap on one side of the housing receiving a first raised element 105 and a second lateral band overlapping the other raised element 107. The lateral bands can come together substantially in the 12:00 position of the nacelle 3.

At least one half-ring 109 can comprise a foolproof device 191 so as to avoid closing and locking said half-ring 109 without the raised elements 105 and 107, i.e. without the two raised elements 105 and 107 being received in the housing 111. The foolproof device 191 can assume the form of a longitudinal extension 191 of one of the walls of the abutment means 113 (see FIG. 17). As a result, this extension 191 abuts against the raised element 105 of the outer fixed structure or the casing. According to one alternative, the foolproof device 191 can assume the form of two longitudinal extensions of the walls of the abutment means 113. Furthermore, such a foolproof device is seen by the operator, who then identifies that one of the raised elements 105 and 107 has not been received in the housing 111 of the half-ring 109.

The foolproof device 191 can be local, multiple or continuous. In other words, the foolproof device 191 can extend over all or part of the periphery of the half-ring 109 in one or more sectors.

At least one or even both of the half-rings 109 can be made in a single piece or formed from a multitude of parts so as to adapt the flexibility or rigidity of the half-ring 109. In the event a half-ring 109 is made in several parts, it is possible to add a substantially annular reinforcing means, in particular on the outer wall of said half-ring 109.

In this way, a half-ring 109 can be made up of two parts. The first part can comprise the hinge and the lock and the second part can comprise the housing 111 configured to receive the first 105 and second 107 raised elements. The second part can be made in a single piece or with several sectors, and/or from several materials, such as aluminum or titanium. In the case where the second part is made in several sectors, the sectors can be connected to one another for example by rivets. The presence of several sectors advantageously makes it possible to lift the half-ring 109 on the parts with a small travel, in particular less than 10°.

Thus, at least one or even each sector 201a, 201b can be mounted hingedly on the following one, as shown in FIGS. 18 to 21.

As shown in FIG. 18, a sector 201a is connected to an adjacent sector 201b by a pin 203 allowing the pivoting of the sector 201a.

The positioning configuration of the pivot is done according to FIGS. 18 and 19 depending on the position of the pulling force so as to return the hinge point to the appropriate plane.

As shown in FIG. 19, the sector 201a can contain an abutment at the hinge 205 to help with the opening of the following sector.

As shown in FIGS. 20 and 21, the hinge of the sector 201a is associated with one or two levers 211 mounted on either side of said sector 201a so as to facilitate the unlocking and lifting of the sector 201a. The lever(s) 211 can bear on the casing 27 and/or on the outer fixed structure 15. As illustrated in FIG. 21, the rotation of the first sector 201a drives the contact of the lever 211 on the fixed surface of the casing 27 or the outer fixed structure 15. Owing to this contact, the second sector 201b can also lift to reach the unlocking position.

Figures 22, 23:
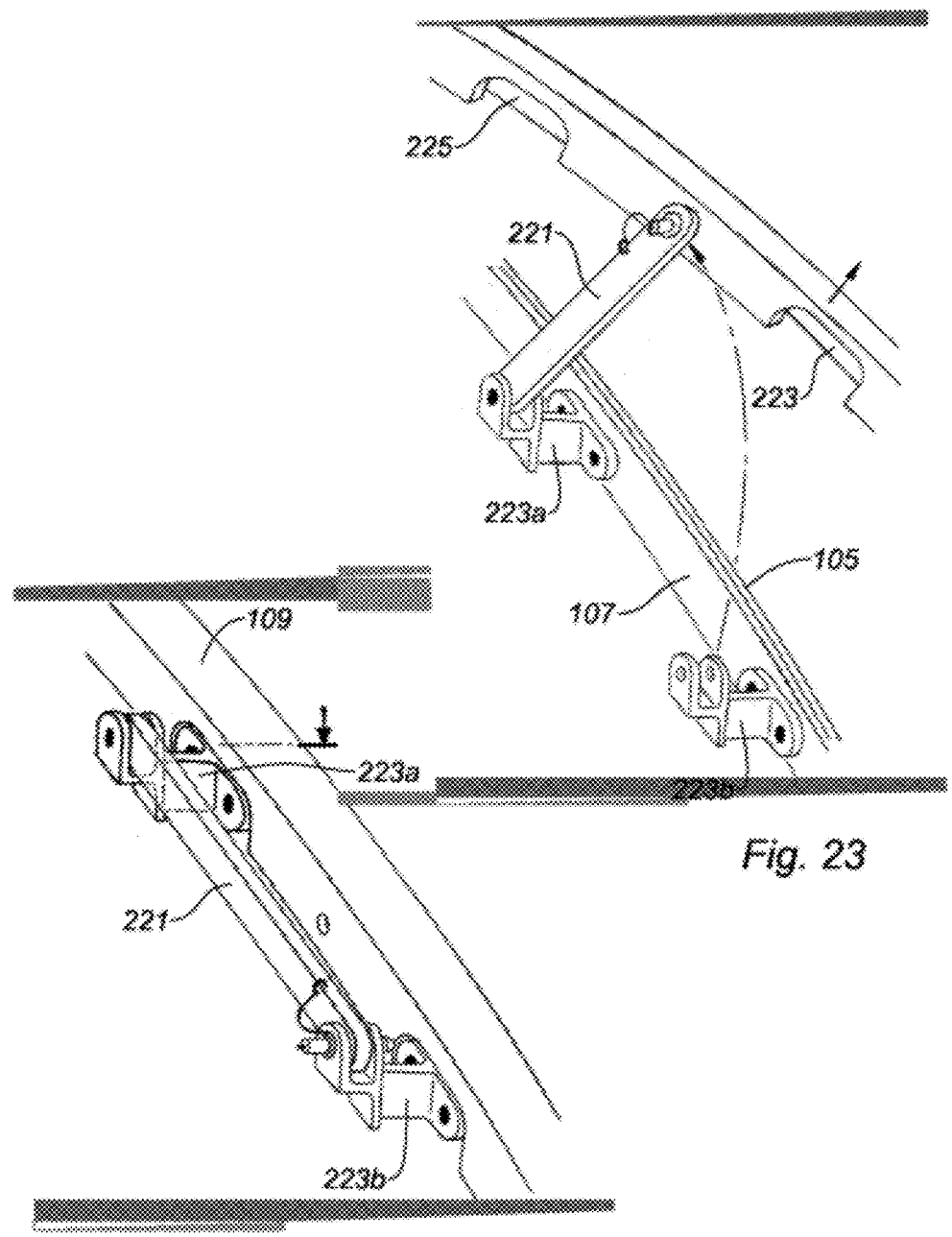
FIGS. 22 and 23 are perspective side views of an alternative of the holding assembly according to the invention.

At least one or even both of the half-rings 109 can comprise a holding means configured to support said half-ring 109 in the unlocking position. As shown in FIGS. 22 and 23, the holding means can assume the form of a connecting rod 221 fastened on said half-ring 109 and on a holder 223a and 223b secured on the casing 27 or on the outer fixed structure 15, in particular on one of the raised elements 105 or 107. To that end, the half-ring 109 can comprise openings 225 and 227 so as not to interfere with the holders fastened on one of the raised elements 105 and 107 when the half-ring 109 is in the locking position, i.e. housing the two raised elements 105 and 107. More precisely, the holder 223a and 223b can be made up of a first fitting 223a and a second fitting 223b, the first fitting being configured to receive the pivoting end of the connecting rod 221 and the second fitting 223b being able to receive the end of the connecting rod 221 connected to the half-ring 109. Typically, the first fitting 223a and the second fitting 223b are positioned on the same side of the half-ring 109.

According to another alternative shown in FIGS. 24 and 25, the holding means can comprise a fitting 231 mounted in the cowl 233 of the outer fixed structure, which makes it possible not to perform the release at the half-ring 109 and to reduce the mass of said holding means. To that end, the cowl 233 can be formed from two parts configured to be lifted in the unlocking position and which are fastened in the normal operating position at the 6:00 position of the nacelle 3. The fitting 231 is then arranged downstream of the cowl 233 and comprises a housing 235. Arranged on the half-ring 109 is a holder 237 comprising a rod 239 configured to cooperate with the housing 235. Thus, simply, when the operator wishes to separate the cowl 233 and the half-ring 109, said operator removes the rod 239 from the housing 235.

The inventive assembly 101 can comprise a means for detecting the position of the components of the assembly relative to one another, i.e. raised elements 105 and 107, half-rings 109. As an example, it is possible to use a detection means in the form of permanent electronic sensors, such as a proximity sensor. Furthermore, it is possible to position said sensors, for example at the 6:00 part of the two half-rings 109 or at the fastening means of the two half-rings 109.

Furthermore, the inventive assembly 101 can comprise a means for detecting the locking tension of the two half-rings 109.

According to an embodiment not shown in FIGS. 26 to 28, at least one half-ring 109 is connected to the cover of the fan 251, rigidly or not, which is hinged substantially at the 12:00 part of the nacelle 3. Thus, advantageously, it is possible to use said cover of the fan 251 as a support for at least one or even both half-rings 109. To that end, said half-ring 109 can be associated with the structure of the cover of the fan 251 rigidly, for example via a partition 253 (see FIG. 26) or via a fitting 255 in which the half-ring 109 can be received (see FIGS. 27 and 28).

In the embodiment shown in FIGS. 27 and 28, said half-ring 109 is mounted in the fitting 255 so as to have lateral play 257, which allows better gripping of the cowl 251 during the release of the half-ring 109.

Figure 29:
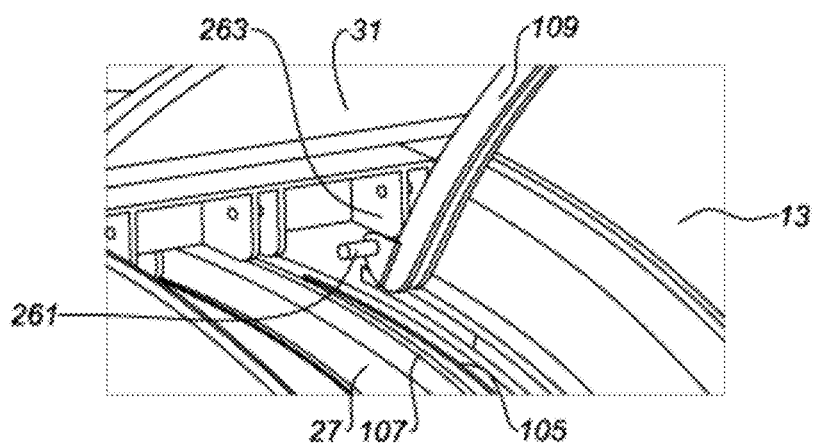
FIG. 29 is an enlargement of zone XXIX of the embodiment of FIG. 28.
Figure 3:
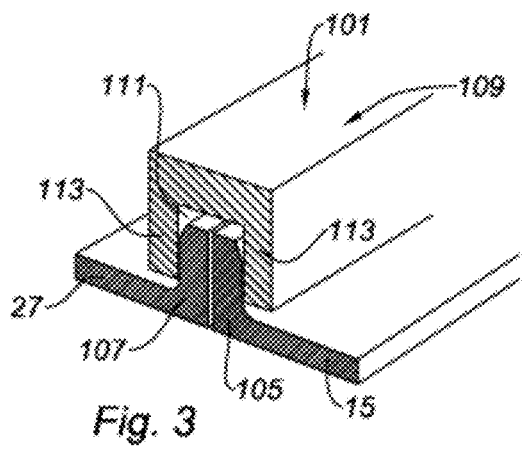
FIG. 3 is a perspective view of one embodiment of a holding assembly according to the invention.

As shown in FIG. 29, at least one or even both of the half-rings 109 are mounted on the upper part of the outer fixed structure 15 and therefore the nacelle 3, which makes it possible to have the greatest possible release and facilitate access to the jet engine 5. Thus, one or even both of the half-rings 109 can be hingedly mounted substantially at 12:00 of the outer fixed structure 15 and therefore of the nacelle 3. More precisely, each half-ring 109 can be hinged on the attachment mast 31 via a stationary pivot 261. To that end, a fitting (not shown) can be attached on the attachment mast 31. It is also possible to unite the two fittings of the two half-rings 109 by a rigid inner structure 263 as close as possible to the traction axis so as to avoid any force created by the lever arm-type movement created by the unlocking of a half-ring 109.

The traction axis is defined here by an axis passing through a surface parallel to the surface to be gripped through which the circumferential locking forces pass.

According to an alternative not shown, the half-ring(s) 109 can be fastened via a fitting on the casing 27, which makes it possible to contain the alignment of the two half-rings 109 relative to the interface of the casing 27 and the outer fixed structure 15. It is possible to unite the two fittings using a rigid structure inside the attachment mast 31 as close as possible to the traction axis so as on the one hand to avoid any lever arm-type force created by the unlocking of the half-ring 109 and on the other hand to ensure the peripheral load integrity.

According to one alternative, the stationary fittings of the preceding embodiments can be replaced by a connecting rod connecting the pivot points arranged on each side of the attachment mast 31 so as to ensure the peripheral load continuity. Typically, said connecting rod can be placed in a plane close to the traction axis.

In this case, the connecting rod is "floating," i.e. mounted through the attachment mast 31 so as not to create additional force between the two half-rings 109 and react any differential movement between the stationary structure of the nacelle 3 and that of the jet engine 5.

Figure 30:
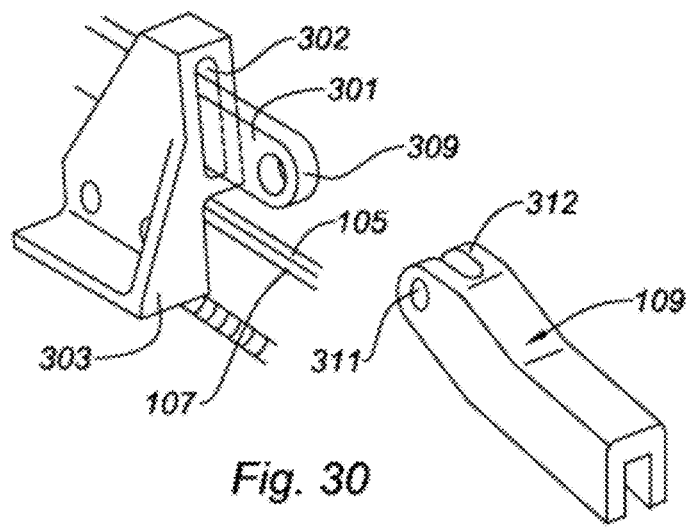
FIGS. 30 to 31 are perspective views of alternatives for attaching a half-ring of the holding assembly according to the invention.
Figure 31:
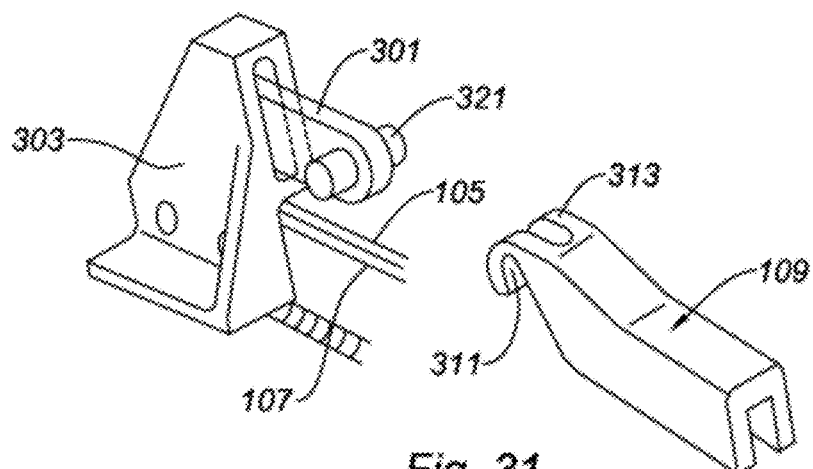

According to an embodiment shown in FIG. 30, the floating connecting rod 301 can pass through a housing 302 formed in the holder 303 of the half-ring 109 that is supported by the casing 27. Thus, advantageously, when the half-ring 109 is in the locking position, i.e. retaining the casing 27 and the outer fixed structure 15, the connecting rod 301 is not in contact with the walls of the housing 302. One end 309 of the connecting rod 171 can be configured so as to cooperate with the complementary part of the half-ring 109. To that end, the end opposite the connecting rod 301 has two protuberances 311 and 313 configured to grip the free end 309 of the connecting rod 301. The two ends 309 and 311, 313 are fastened to one another for example via a rod or a bolt (not shown). Advantageously, the holder 303 only undergoes the forces to keep the half-ring in position. According to an alternative shown in FIG. 31, the ends 311 and 313 can assume the form of hooks configured to grip a rod 321 of the end 309 of the connecting rod 301.

The invention claimed is:

1. A holding assembly holding an interface of a stationary outer structure of a nacelle and a casing of a jet engine, the holding assembly comprising:
   a first raised element belonging to an upstream end of the outer fixed structure;
   a second raised element belonging to a downstream end of the casing;
   said first and second raised elements being formed so as to be placed in contact with each other; and
   two half-rings formed by a wall defining a housing that is formed so as to receive the first and second raised elements when the casing and the outer fixed structure are mounted edge to edge, and an abutment means formed so as to keep the first and second raised elements in the housing, wherein at least one half-ring comprises a holding means configured to support said half-ring in the unlocking position,
   wherein the holding means is in the form of a connecting rod fastened on said half-ring and on a holder fastened on the casing or on the outer fixed structure.

2. The holding assembly according to claim 1, wherein the wall forms the housing with a substantially U- or V-shaped transverse section.

3. The holding assembly according to claim 1, wherein longitudinal and/or transverse play is present between a non-facing surface of the raised elements and the wall forming the housing.

4. The holding assembly according to claim 1, wherein at least one raised element has a ramp configured to cooperate with at least one lateral edge of the wall that has an inclined surface complementary to the ramp when said raised element is inserted in the housing.

5. The holding assembly according to claim 1, wherein at least one raised element comprises a sealing means so as to ensure sealing between the first raised element and the second raised element when the latter are received in the housing.

6. The holding assembly according to claim 1, wherein at least one of the first and second raised elements comprise a transverse centering means relative to a longitudinal axis of the nacelle.

7. The holding assembly according to claim 1, wherein at least one half-ring comprises a foolproof device.

8. A holding assembly holding an interface of a stationary outer structure of a nacelle and a casing of a jet engine, the holding assembly comprising:
   a first raised element belonging to an upstream end of the outer fixed structure;
   a second raised element belonging to a downstream end of the casing;
   said first and second raised elements being formed so as to be placed in contact with each other; and
   two half-rings formed by a wall defining a housing that is formed so as to receive the first and second raised elements when the casing and the outer fixed structure are mounted edge to edge, and an abutment means formed so as to keep the first and second raised elements in the housing,
   wherein at least one half-ring is formed from a multitude of parts, the part comprising the housing is made in several sectors secured to one another by fastening means, at least one sector being hingedly mounted on the next one, and wherein the articulation of the sector is associated with one or two levers mounted on either side of said sector so as to facilitate the unlocking of the sector.

9. The holding assembly according to claim 1, wherein each half-ring is hingedly mounted substantially at 12:00 on the outer fixed structure.

10. A propulsion assembly comprising a jet engine housed in a nacelle that can be connected to an aircraft by an attachment pylon, the jet engine comprising fan blades surrounded by a casing mounted edge to edge with an outer fixed structure of the downstream structure of the nacelle that houses thrust reverser means, said propulsion assembly comprising the holding assembly which holds an interface of the outer fixed structure of the nacelle and the casing of the jet engine, the holding assembly comprising:
   a first raised element belonging to an upstream end of the outer fixed structure;
   a second raised element belonging to a downstream end of the casing;
   said first and second raised elements being formed so as to be placed in contact with each other; and
   two half-rings formed by a wall defining a housing that is formed so as to receive the first and second raised elements when the casing and the outer fixed structure are mounted edge to edge, and an abutment means formed so as to keep the first and second raised elements in the housing, wherein at least one half-ring is hinged on the attachment pylon or on the casing via a stationary pivot.

11. The propulsion assembly according to claim 10, wherein at least one half-ring is mounted substantially at 12:00 on the nacelle.

12. The propulsion assembly according to claim 10, wherein a connecting rod connecting the pivot points positioned on each side of the attachment mast fastens the half-rings to one another.

13. The propulsion assembly according to claim 10, wherein at least one half-ring is mounted on the upstream cowl at the outer fixed structure.

14. The propulsion assembly according to claim 13, wherein the two half-rings are supported by the upstream cowl with play.

15. The propulsion assembly according to claim 10, wherein at least one half-ring is connected to the cowl via a partition or a fitting configured to receive a half-ring.

* * * * *